United States Patent [19]

Takashiro

[11] Patent Number: 5,307,453
[45] Date of Patent: Apr. 26, 1994

[54] GRAPHIC DATA PROCESSING SYSTEM

[75] Inventor: Hiroaki Takashiro, Kanagawa, Japan

[73] Assignee: Fuji Xerox Co., Ltd., Tokyo, Japan

[21] Appl. No.: 770,483

[22] Filed: Oct. 3, 1991

[30] Foreign Application Priority Data

Dec. 12, 1990 [JP] Japan .................................. 2-401694

[51] Int. Cl.$^5$ .............................................. G06F 15/60
[52] U.S. Cl. ...................................... 395/133; 395/141
[58] Field of Search ............... 395/133, 141, 135, 138, 395/142; 340/747, 750, 706, 723, 724, 728; 364/512, 474.24

[56] References Cited

U.S. PATENT DOCUMENTS

| | | | |
|---|---|---|---|
| 5,115,494 | 5/1992 | Seki ....................................... | 395/127 |
| 5,138,697 | 8/1992 | Yamamoto et al. ................. | 395/120 |
| 5,189,626 | 2/1993 | Colbun ............................ | 364/474.24 |

*Primary Examiner*—Phu K. Nguyen

*Attorney, Agent, or Firm*—Finnegan, Henderson, Farabow, Garrett & Dunner

[57] ABSTRACT

A graphic data processing system including an entering unit for entering a two-dimensional polygon, a copying unit for copying the two-dimensional polygon entered by the entering unit to another location separated from the original location by a prescribed distance, and a connecting unit for connecting vertexes of the two-dimensional polygon entered by the entering unit and corresponding vertexes of the two-dimensional polygon copied by the copying unit, whereby to form a prismatic figure. Further, the graphic data processing system may include a vertex-entering order judging unit for judging the order of the vertexes of the two-dimensional polygon entered by the entering unit, and a shade processing unit for processing shades of the prismatic figure in response to a result of the judgement made by the vertex-entering order judging unit.

5 Claims, 4 Drawing Sheets

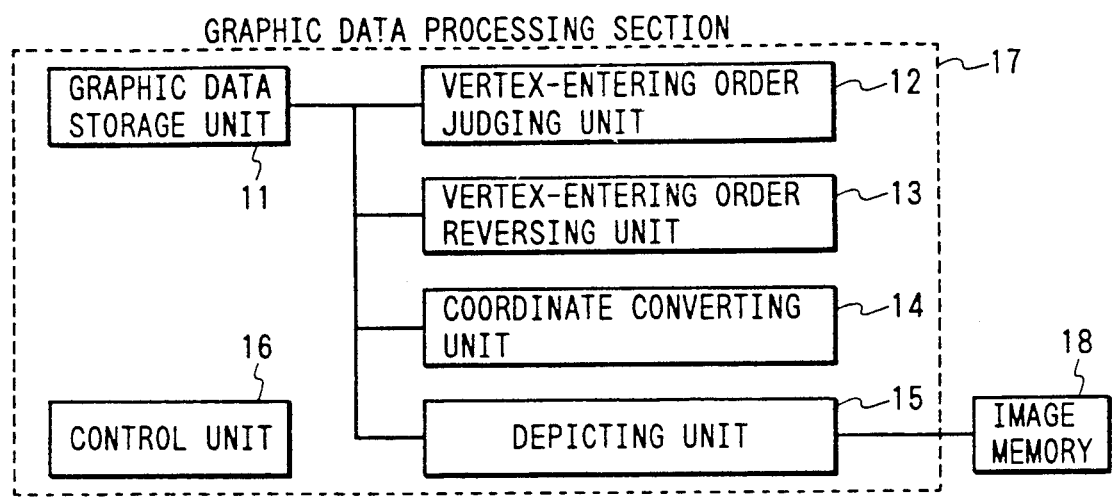
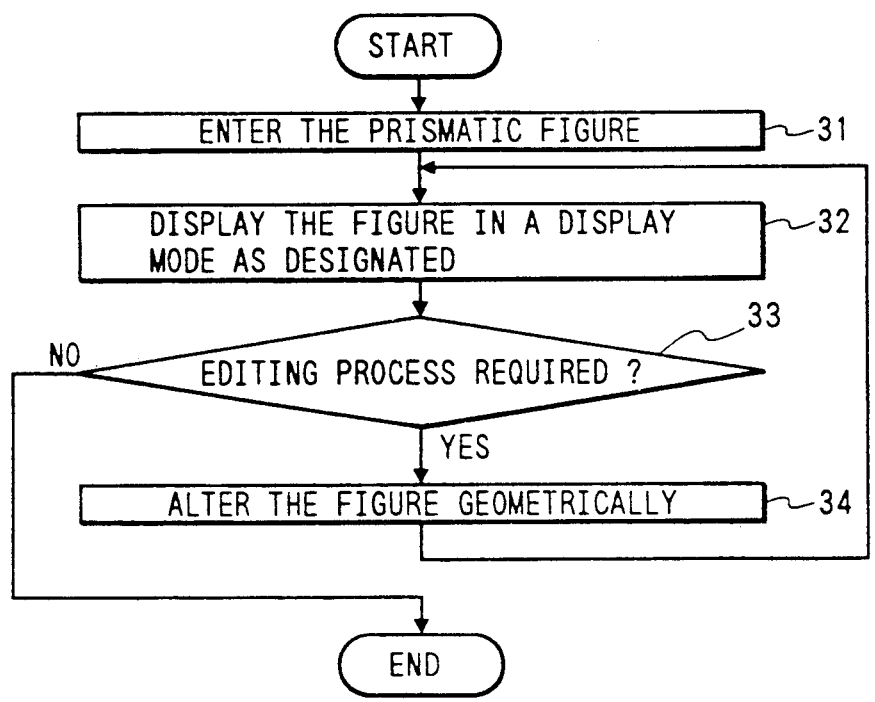

GRAPHIC DATA PROCESSING SYSTEM

BACKGROUND OF THE INVENTION

1. Field of the Invention

The present invention relates to a graphic data processing system for generating and displaying a prismatic figure as one of solid figures, and a graphic data processing method used for the graphic data processing system.

2. Discussion of the Related Art

In recent presentation materials, such as office documents, brochures, and catalogs, many figures are used to make an effective presentation. There are many types of figures, such as figures each including a simple line or a simple circle, complicated figures, and colored figures. In these figures, the prismatic figures, such as rectangular prisms and triangular prisms, are frequently used.

To form a prismatic figure, a three-dimensional graphic processing technique is sometimes used because the figure is solid or three-dimensional. The three view drawings are usually used to set a solid figure by the three-dimensional graphic processing technique. After the shapes of the solid figure as viewed in three directions are entered to the machine by using the three views drawings, the figure is rotated in a three-dimensional space, to adjust the direction of the figure. In the figure rotation work, an operator often cannot rotate the figure as he desires. If the direction of the figure can be adjusted, he experiences another difficulty in adjusting the size of the figure, such as the height and width. If the size adjustment is unsatisfactory, the operator must return to the first step of entering the shape by the three view drawings, and start the figure forming work from the first step again. Thus, the figure forming work consumes much time and labor.

Another way to form a prismatic figure uses a two-dimensional graphic processing technique. In this technique, the operator depicts the solid figure by appropriately combining lines and planar figures so as to form a figure having the direction, size and shape as he desires. When using the two-dimensional graphic processing technique, the figure can be entered as the operator desires. Where the number of faces of the prismatic figure is increased, the numbers of lines and faces that must be handled are increased. Formation of such a prismatic figure takes much effort. To alter a geometrical configuration of a solid figure once entered, viz., to change the size and height of the figure, the altering operation must be applied to each of the combined figures, and hence the altering work is time-consuming and troublesome.

SUMMARY OF THE INVENTION

The present invention has been made in view of the above circumstances and has an object to provide a graphic data processing system which enables an operator to easily form and display a prismatic figure having the direction, size, and shape as he desires, and hence successfully solves the problems of consuming much time and labor, and requiring complicated and troublesome operation, which are entailed by the three-dimensional graphic processing technique used in forming solid figures.

Another object of the invention is to provide a graphic data processing method used for the graphic data processing system.

A graphic data processing system according to the present invention comprises: entering means for entering a two-dimensional polygon; copying means for copying the two-dimensional polygon entered by the entering means to another location separated from the original location by a prescribed distance; and connecting means for connecting vertexes of the two-dimensional polygon entered by the entering means and corresponding vertexes of the two-dimensional polygon copied by the copying means, to form a prismatic figure.

A graphic data processing method according to the present invention comprises the steps of: entering a two-dimensional polygon; copying the entered two-dimensional polygon to another location separated from the original location by a prescribed distance; and connecting vertexes of the entered two-dimensional polygon and corresponding vertexes of the copied two-dimensional polygon, to form a prismatic figure.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings, FIG. 1 is a block diagram showing a graphic data processor for generating and displaying a figure or figures;

FIG. 3 is a flowchart showing a general flow of processing steps from a step of entering a figure to a step of forming an intended figure;

DETAILED DESCRIPTION OF THE PREFERRED EMBODIMENTS

Figure 2:
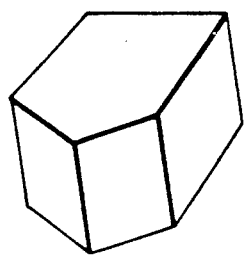
FIG. 2 is a perspective view showing a prismatic figure to be depicted by the graphic data processing system of the invention.

A preferred embodiment of the invention will be described with reference to the accompanying drawings.

As shown in FIG. 1, a graphic data processing system comprises a graphic data storage unit 11 for storing graphic data, such as the coordinates of the vertexes of figures, and the modes of display; a vertex-entering order judging unit 12 for judging the order of a series of vertexes of a prism that are entered; a vertex-entering order reversing unit 13 for reversing the order of the vertexes entered; a coordinate converting unit 14 for converting the coordinate values of a figure when a geometrical editing is applied to the figure; a depicting unit 15 for making figure generation, such as depicting operation of lines, and paint-out operation; and a control unit 16 for controlling the above units 11 to 15. The units 11 to 16 constitute a graphic data processing section 17. Graphic image data generated by the depicting unit 15 are stored into an image memory 18.

FIG. 2 shows a prismatic figure whose bases, or the top and bottom faces, each take a polygonal shape with a V-shaped edge. Generation and display of this prismatic figure will be described hereinafter. In the embodiment of the invention to be given, the invention will be applied to a pentangular prism, but it should be expressly understood that the present invention may be applied to a prism with any number of angles, the bottom of which has a V-shaped edge.

The prismatic figure has two faces facing each other as the bases. Of those faces, the face that can be seen in a shade erase display mode will be referred to as a top face, and the face that cannot be seen will be referred to as a bottom face, for ease of explanation. The faces other than the top and bottom faces will be referred to as lateral faces.

A general flow of the processing from a step of entering the prismatic figure to a step of completing the formation of the figure is shown in FIG. 3.

Figure 4A:
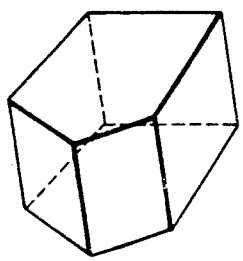
FIGS. 4(a) and 4(b) are perspective views in two types of display modes which are respectively based on a wire frame display technique and a shade erase display technique.
Figure 4B:
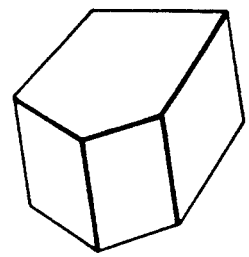

In the general flow, the prismatic figure is first entered by setting the coordinates of the vertexes of the figure (step 31). The figure entered is displayed in a display mode as designated (step 32). There are many display modes, but two display modes as shown in FIGS. 4(a) and 4(b) will be used in the description. The display of FIG. 4(a) is based on a wire frame display technique, and the display of FIG. 4(b) is based on a shade erase display technique. There is another shade erase display technique. In this display technique, the inside of the faces are painted out, while in the former display technique, the edge lines are displayed. Those display techniques are substantially the same except the above difference. If required, an editing process is applied to the displayed figure (step 33).

If the editing process is not required, the processing operation ends. If it is required, control advances to the next step of editing. In the instant embodiment, the figure is geometrically altered in the editing process (step 34). Specifically, the values of the coordinates of the figure are changed to alter the entered figure. At this time, if necessary, instructions to change the display mode may be entered. After the editing process, the displaying process is performed again to display the edited figure.

The respective processes in the general flow will be described.

Figure 5A:
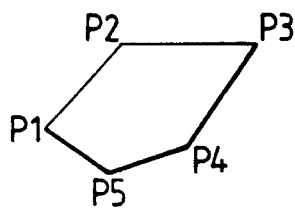
FIGS. 5(a) through 5(c) are perspective views diagrammatically illustrating a sequence of the process for forming the pentangular prism shown in FIG. 2.
Figure 5B:
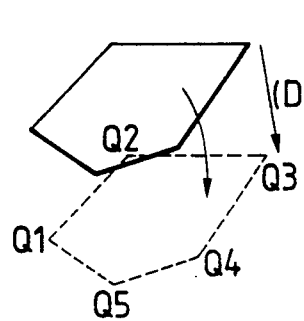
Figure 5C:
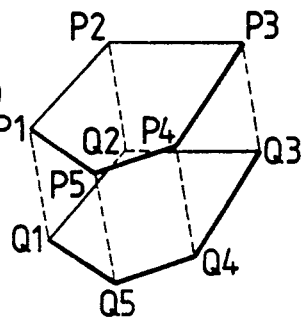
Figure 6:
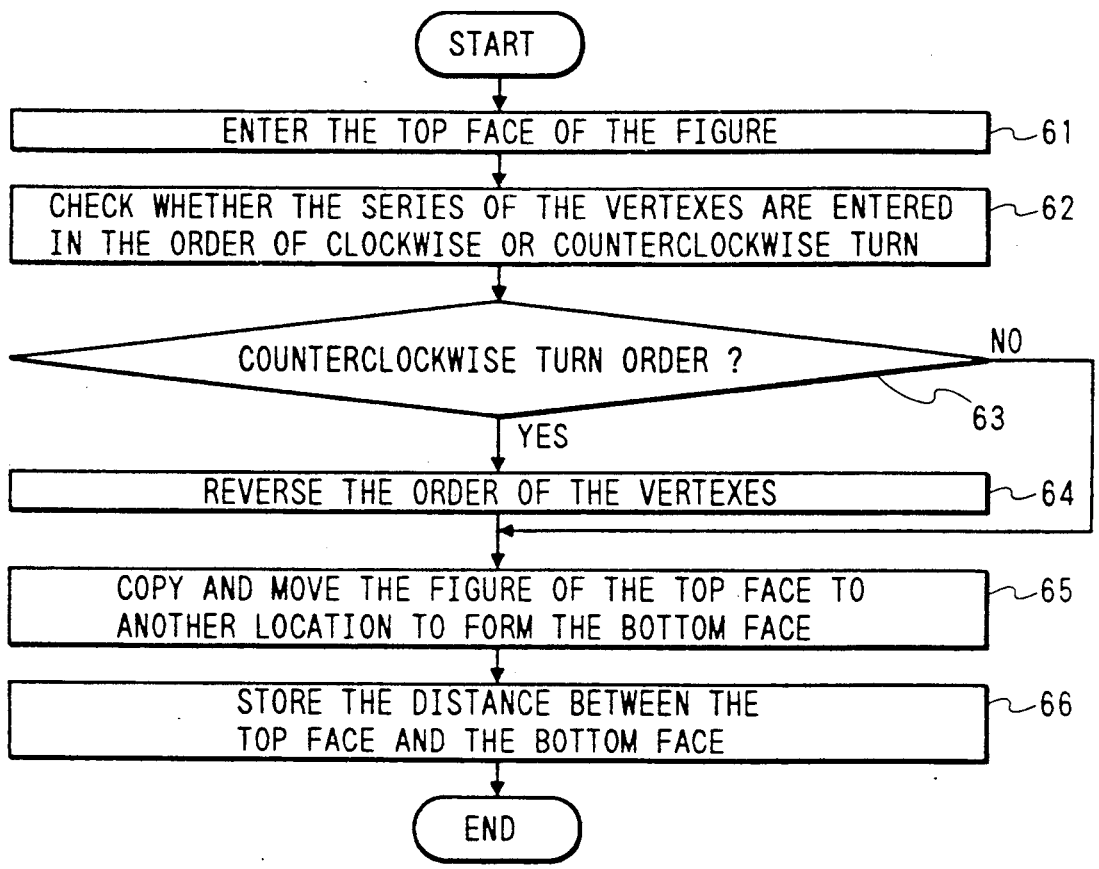
FIG. 6 is a flowchart showing a flow of the processing of entering the figure.

How to enter the prismatic figure will first be described. FIGS. 5(a) through 5(c) show perspective views illustrating a sequence of the process up to obtaining the prismatic figure, or the pentangular prism shown in FIG. 2. FIG. 6 is a flowchart showing a flow of the processing of entering the figure.

To start, as shown in FIG. 5(a), a pentangular face as the top face of the prismatic figure is prepared (step 61). The top face entered is not the face obtained when an operator views the prismatic figure from right above in a three-dimensional space, but the face when he views it at a desired angle. To form the pentangular figure, the top face is entered in the same manner as that of entering a polygonal figure in the two-dimensional face, viz., by instructing a series of vertexes of the figure. A two-dimensional polygonal figure already formed, if present, may be used for the top face of the figure. The computer checks whether the series of the vertexes are entered in the order of clockwise or counterclockwise turn as viewed from above of the drawing (step 62). If the vertexes are entered in the clockwise turn order, the order of the vertexes is left as it is. If they are entered in the counterclockwise turn order, the order of the vertexes is reversed (steps 63 and 64). The setting of the order of the vertexes to the clockwise turn order is required for the shade erase display, which is to be performed later. The vertexes of the top face formed are denoted as P1, P2, P3, P4, and P5 in the clockwise turn order. Then, as shown in FIG. 5(b), the figure of the top face is copied and moved to another location on the display, and the bottom face of the prismatic figure is formed (step 65). The relocation of the top face allows the operator to adjust the height of the prismatic figure and the shape of the whole figure. Distance between the top face and the bottom face of the figure is stored in the terms of Dx, Dy (step 66). The bottom face of the figure is related to the top face in some way. In this instance, the vertexes of the bottom face are denoted as Q1, Q2, Q3, Q4, and Q5 in connection with the vertexes P1, P2, P3, P4, and P5 of the top face. A figure shown in FIG. 5(c) is displayed for indicating a solid figure. In the figure, the corresponding vertexes between the top and bottom faces are connected by dotted lines.

Description to follow is elaboration as to how the solid figure is displayed using the group of the entered vertexes.

Figure 7:
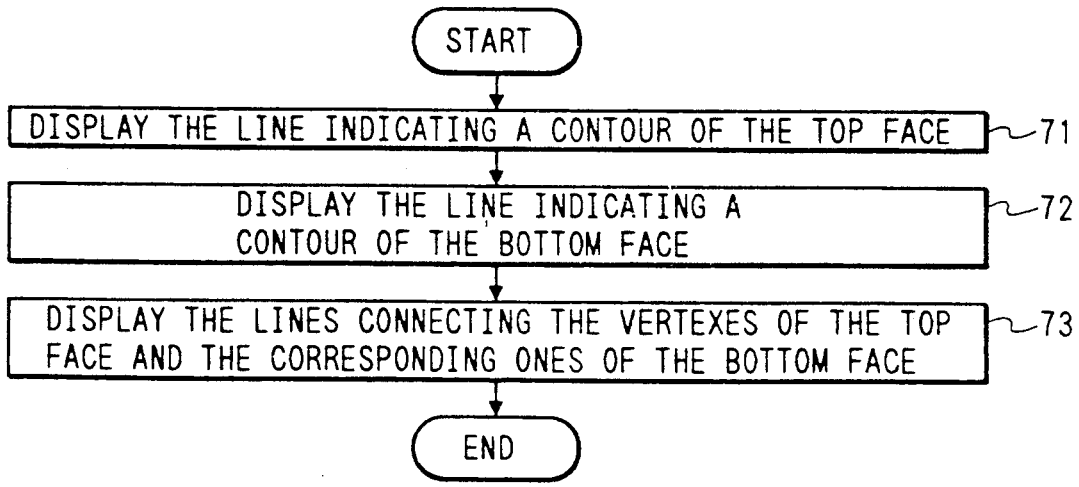
FIG. 7 is a flowchart showing a flow of the processing for a wire frame display.

A processing method of displaying the solid figure in the wire frame display mode will first be described. An example of the display used in the description that follows is shown in FIG. 4(a) already referred to. The processing of displaying the solid figure flows as shown in FIG. 7. As shown, lines indicating a contour of the top face of the figure are displayed (step 71), and lines indicating a contour of the bottom face are displayed (step 72). Then, lines connecting respectively the vertexes of the top face and the corresponding ones of the bottom face are displayed (step 73).

Figure 8:
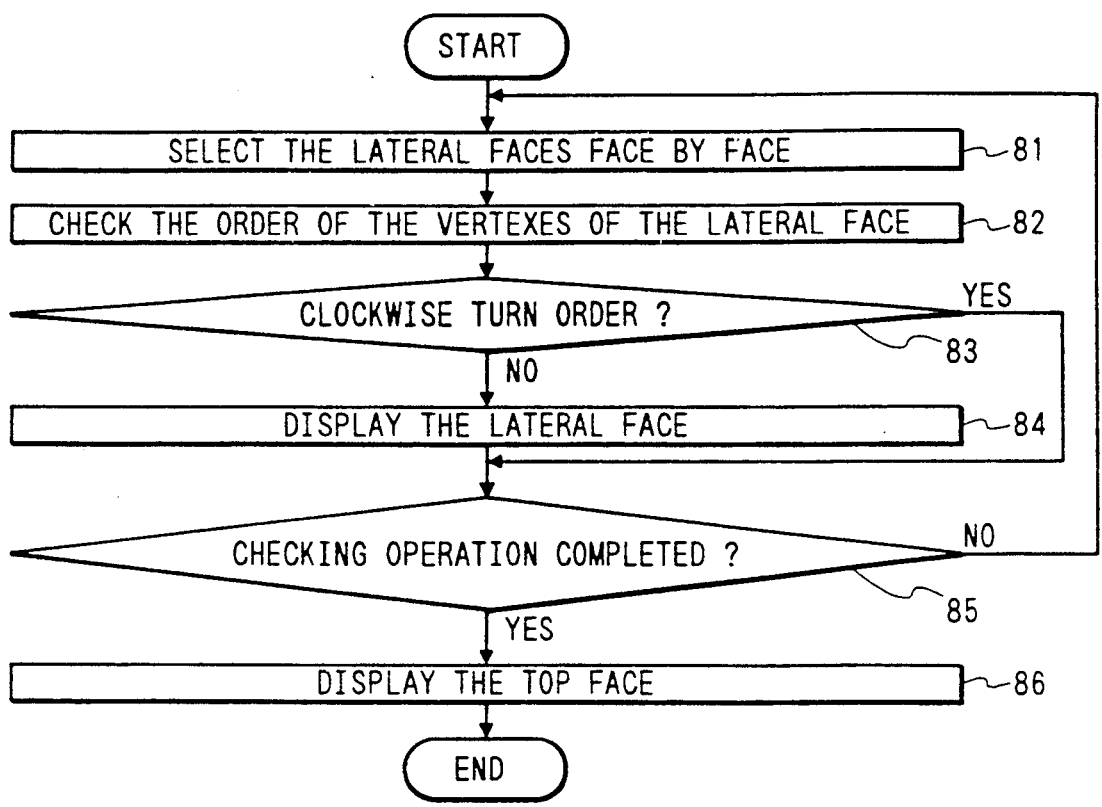
FIG. 8 is a flowchart showing a flow of the processing for a shade erase display.

As shown in FIG. 4(b), an appearance of the solid figure as viewed from the operator is displayed, while the rear faces of the figure shaded by the fore faces are not displayed. The prismatic figure treated in the invention has a V-shaped edge, and hence only the faces of the solid figure, which form the front side of the figure when viewed in the drawing, are displayed. A flow of the display processing is shown in FIG. 8. Two types of lateral faces exist, the lateral faces not shaded and the lateral faces shaded. Accordingly, control checks whether the lateral face is the shaded one or the unshaded one, and performs the display on the basis of the check result. Details of the processing will be described along with the processing flow in the flowchart. The lateral faces are selected one face at a time (step 81). Each selected face is checked to determine its type, that is, shaded or unshaded. To this end, the vertexes are checked in the order of $P_k$, $Q_{k+1}$, $P_{k+1}$ ($k=1$ to $(n-1)$, where n is the number of angles of the polygonal figure of the bottom face of the prismatic figure) of the lateral face when they are entered, viz., the clockwise or counterclockwise turn order (step 82). The n-th lateral face is checked in the order of the vertexes Pn, Qn, Q0, and P0 thereof. In this instance, when the vertexes are entered in the clockwise turn order, the lateral face is deemed to be the unshaded one. Accordingly, the lateral face is displayed. When those are entered in the counterclockwise turn order, the lateral face is deemed to be the shaded one, and is not displayed (steps 83 and 84). For example, the lateral face, which has the vertexes entered in the order of P4, Q4, Q5, and P5, is unshaded, and is displayed. The lateral face, which has the vertexes entered in the order of P1, Q1, Q2, and P2, is shaded, and is not displayed. After completing the checking operation in the order of entering the vertexes of all the lateral faces, the remaining faces are processed (step 85). Since the top face is unshaded, it is displayed (step 86). The bottom face figure is shaded, and is not displayed. Here, a shade-line erase display exists. In this display, the unshaded faces of a solid figure are detected as in the shade erase display. After the detection, lines of a contour of the unshaded faces are displayed, instead of painting-out.

Finally, the editing process will now be described. Frequently, the size and direction of a figure once formed must be changed. There are many methods of editing a geometrical figure. In the description given hereinafter, two geometrical editing methods will be described.

Figure 9A:
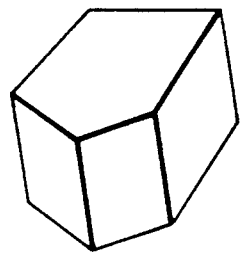
FIGS. 9(a) and 9(b) are perspective views useful in explaining a geometric editing to change the height of a prismatic figure.
Figure 9B:
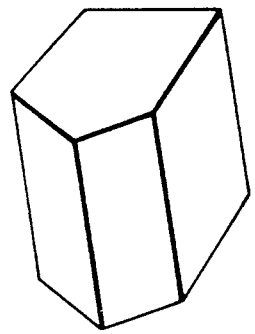

FIGS. 9(a) and 9(b) show perspective views of prismatic figures diagrammatically showing how a shape of the whole prismatic figure is altered. FIG. 9(a) is a perspective view showing the shape of a prismatic figure before it is altered, and FIG. 9(b) is a perspective view showing the shape of the figure after it is altered. In this processing to alter the shape of the whole prismatic figure, the top face is moved relative to the bottom face, thereby changing the height of the figure. The shape of the prismatic figure may be changed into a deformed shape when the original figure is obliquely pushed. In connection with the processing of altering the whole figure shape, the operator selects the top face of the prismatic figure and moves it to the intended location. Thus, the coordinates of the vertexes of the top face are changed. Following the relocation of the top face, the figure is displayed again by the display technique as mentioned above. If required, the same processing may be applied not only to the top face but also to the bottom face.

Figure 10A:
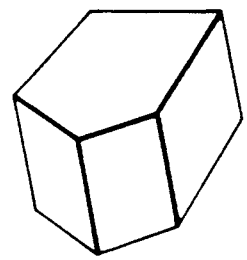
FIGS. 10(a) and 10(b) are perspective views useful in explaining a geometric editing to change the areal size of the base of a prismatic figure.
Figure 10B:
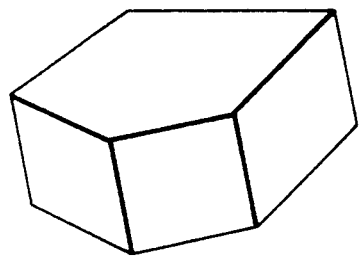

FIGS. 10(a) and 10(b) show perspective views of prismatic figures for explaining the altering process of the size of the top and bottom faces of the figure. FIG. 10(a) is the perspective view showing a shape of a prismatic figure before it is altered, and FIG. 10(b) is a perspective view showing the shape of the prismatic figure after it is altered. This editing process is for changing a cross sectional area of the prismatic figure. In connection with this editing process, the operator selects the top face of the figure and changes its areal size (in this instance, increases the area). The bottom face is formed by relocating the areal-size-changed top face to another location. In this case, a distance between the original location of the top face and the new location is expressed by (Dx, Dy). The center as a reference point for changing the areal size is set at the center of gravity of the top face, although it is not limited to the gravity center. Following the areal-size magnifying process, the figure is displayed again by the display technique mentioned above.

Figure 11:
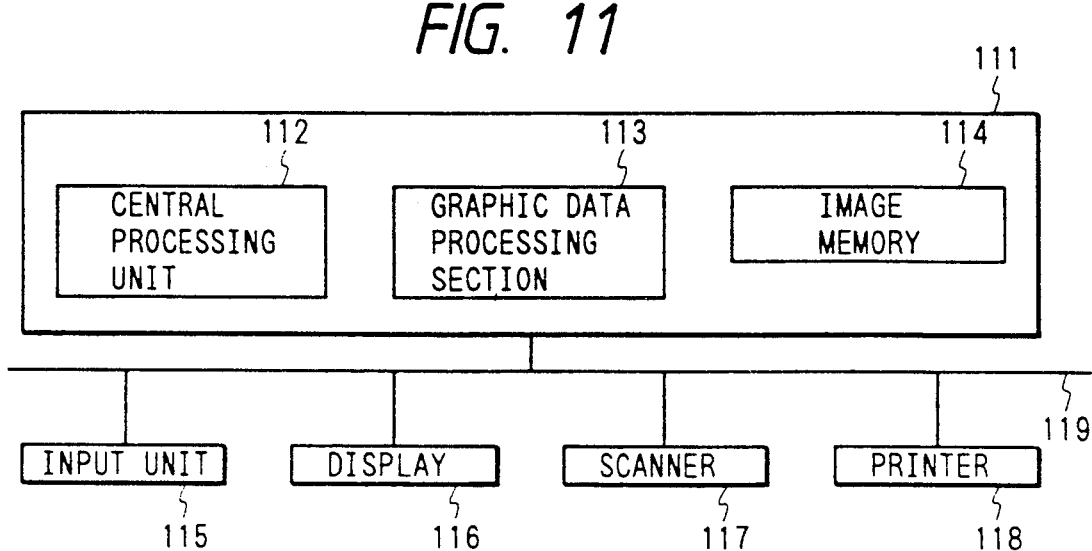
FIG. 11 is a block diagram showing a hardware construction useful in explaining the present invention.

FIG. 11 is a block diagram showing a hardware construction useful in explaining the present invention. In the figure, reference numeral 111 designates a computer; 112, a central processing unit; 113, a graphic data processing section; 114, an image memory; 115, an input unit; 116, a display; 117, a scanner; 118, a printer; and 119, a bus. The input unit 115 is for entering instructions to the computer 111. The display unit 116 is for displaying an image. The scanner 117 is for inputting an image. The printer 118 prints out a hard copy of the image. The bus 119 is a path for transferring image data, graphic data, and control data among those units. The image memory 114 stores image data. The central processing unit 112 controls the hole image processing system, and performs the general calculations. The graphic data processing section 113 generates and displays the figures as described above, and is configured as shown in FIG. 1.

As seen from the foregoing description, when using the graphic data processing system of the invention, the operator can easily form a prismatic figure having the direction, size, and shape as he desires.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A graphic data processing system comprising:
   entering means for entering a two-dimensional polygon;
   means for copying the two-dimensional polygon to another location in two-dimensional space separated from an original location by a prescribed distance; and
   means for connecting vertexes at the two-dimensional polygon and corresponding vertexes of the two-dimensional polygon, forming a prismatic figure.

2. The graphic data processing system according to claim 1, further comprising:
   means for judging whether the vertexes of the two-dimensional polygon were entered in a clockwise or in a counter-clockwise manner; and
   shade processing means for processing the shades of the prismatic figure in response to a result of a judgement made by said vertex-entering order judging means.

3. A graphic data processing system comprising:
   a storage unit for storing graphic data and modes of display;
   a judging unit for judging whether a series of vertexes of a prismatic figure are entered in a clockwise or in a counter-clockwise manner;
   a reversing unit for reversing an order of the manner in which the vertexes were entered;
   a converting unit for converting coordinate values of the prismatic figure when a geometrical editing is applied to the figure;

a depicting unit for making figure generation; and a control unit for controlling operations of all of said units.

4. A graphic data processing method comprising the steps of:

entering a two-dimensional polygon;

copying the entered two-dimensional polygon to another location separated in two-dimensional space from the original location by a prescribed distance; and connecting vertexes of the entered two-dimensional polygon and corresponding vertexes of the copied two-dimensional polygon, whereby to form a prismatic figure.

5. The graphic data processing method according to claim 4, further comprising the steps of:

judging whether the vertexes of the entered two-dimensional polygon were entered in a clockwise or in a counter-clockwise manner; and processing the shades of the prismatic figure in response to a judgement made by said judging step.

* * * * *

UNITED STATES PATENT AND TRADEMARK OFFICE
CERTIFICATE OF CORRECTION

PATENT NO. : 5,307,453
DATED : April 26, 1994
INVENTOR(S) : Hiroaki Takashiro

It is certified that error appears in the above-indentified patent and that said Letters Patent is hereby corrected as shown below:

Claim 4, Column 7, 3rd (third) line for last, move "in two-dimensional space" to between "location" and "separated"

Signed and Sealed this

Twentieth Day of December, 1994

Attest:

BRUCE LEHMAN

Attesting Officer      Commissioner of Patents and Trademarks